Aug. 7, 1956   H. R. GORDON   2,757,467
PERPETUAL CALENDAR
Filed April 27, 1954

Inventor
Howard R. Gordon
Maurice S. Cayne
Atty.

United States Patent Office 2,757,467
Patented Aug. 7, 1956

2,757,467
PERPETUAL CALENDAR

Howard R. Gordon, Springfield, Ill., assignor to Park Sherman Co., Chicago, Ill., a corporation of Illinois Application April 27, 1954, Serial No. 425,801

3 Claims. (Cl. 40—111)

The invention relates to improvements in calendars and is particularly concerned with the novel construction and assembly of parts in a perpetual calendar.

The structure of the present invention, which has the appearance of a conventional desk calendar, is characterized by the embodiment of a dual set of date sequences so arranged as to be easily and quickly adjusted to correspond with the date-day sequences of any particular month of any year. More particularly, the calendar is what might be termed, a drum type calendar, and it has a rotatable element therein adjustable to position, for viewing, any date sequence required for a particular month. In other words, in instances where the first day of a month is on a Tuesday, one of the dual date sequences can be positioned to locate the first day of the month in the Tuesday column, and should the first day of a month fall on any other day of the week, the date sequences can be relocated to position the first day of the month in the respective column.

It is, therefore, an object of the invention to provide a novel perpetual calendar.

Another object of the invention is to provide a novel perpetual calendar with novel structural characteristics.

Another object is to provide in a calendar a rotatable slidable drum having on its face dual date-sequences, and novel means for journaling said drum in the calendar housing.

Another object is to provide a durable calendar of the character described which is not expensive to manufacture, is easy to operate and very practical in use.

With the foregoing and other objects in view which will appear as the description proceeds, the invention consists of certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
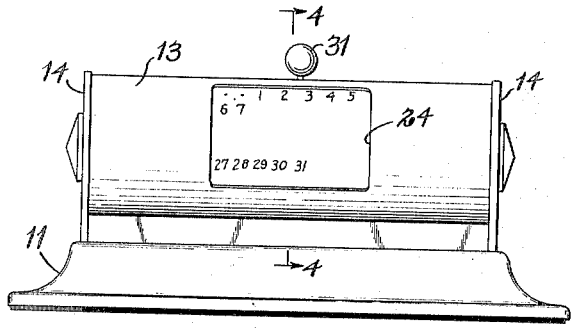
Fig. 1 is a front elevational view of a calendar embodying the features of the present invention.
Figure 2:
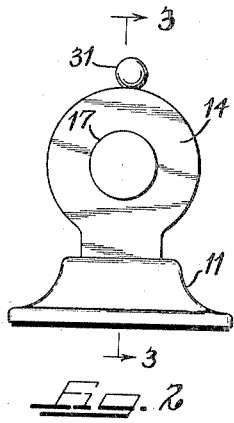
Fig. 2 is an end elevational view of the calendar.
Figure 3:
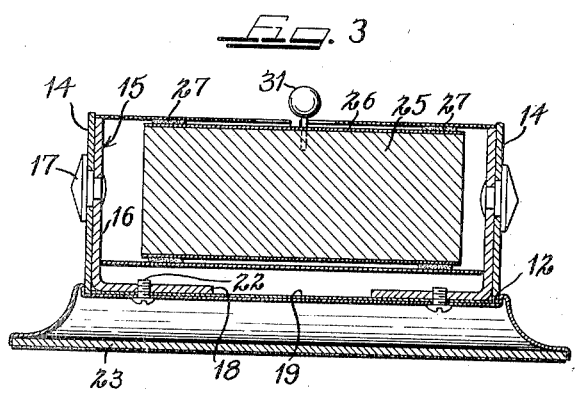
Fig. 3 is a vertical transverse sectional view taken substantially on line 3—3 of Fig. 2.

Referring to the disclosure in the accompanying drawings, the calendar includes a base 11, which preferably is formed of sheet metal stock to include a recessed top surface 12, upon which is mounted a tubular casing or housing 13 enclosing the calendar. The tubular casing 13 is closed, at each end, by a cover plate 14. These plates are slightly larger in diameter than the diameter of the tubular casing 13 so as to overlie the end edges thereof and each has on its inside face a bracket 15. As is best shown in Figure 3, each bracket includes a circular body portion 16 of a diameter to fit snugly within the related end of the tubular casing 13, and it is secured to its related cover plate 14 by a rivet 17. Each bracket 15 includes a foot portion 18 extending perpendicular from the body portion 16 in a plane below the plane of the tubular casing 13. A sheet metal channel 19 is fitted over the foot portions 18 with its side flanges 21 extending upwardly. These side flanges are of sufficient height to abut the outside face of the tubular casing 13 and afford a firm mounting therefor. The parts are secured together and to the base 11 by screws 22 which extend upwardly through the recessed base wall 12, the channel 19 and the foot portions 18 of the brackets 15. If desired, the bottom face of the base 11 may be closed by any suitable means such as, for example, by the plate 23 illustrated.

Figure 4:
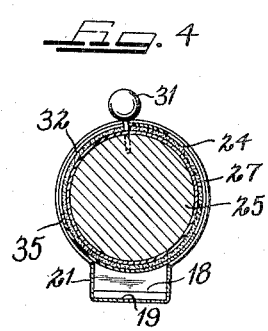
Fig. 4 is a lateral sectional view taken on line 4—4 of Fig. 1.

The tubular casing 13 has a substantially rectangular opening 24 in its forwardly disposed side. This opening constitutes a viewing opening through which the date sequences of a calendar may be viewed. The date sequences are carried on the outside face of a drum 25, preferably by being imprinted or otherwise impressed on a covering sheet 26 secured to said drum. It is preferred that the covering sheet 26 be glazed so as to enhance the overall appearance of the calendar. In view of this and of the fact that the drum 25 is longitudinally slidable and rotatable within the tubular casing 13, means is provided to afford an adequate bearing for said drum of a kind that will prevent scratching or marring of the drum surface. Such means is best illustrated in Figures 3 and 4. As there shown, a band 27, of felt or other comparable material, is secured firmly adjacent each end of the drum 25. These bands are of such thickness as to occupy the space between the drum and the inside surface of the tubular casing 13, and they constitute friction means for holding the drum in any position of selected adjustment.

Before entering into a detailed discussion of the dual date sequences on the drum it is sufficient to note for the present that the sheet 26 contains two complete numerical or date sequences 28 and 29, and that either one or the other may be positioned to be viewed through the viewing opening 24. Such positioning of the date sequences 28 or 29 is accomplished by rotating the drum 25 within the cylindrical casing 13. To this end the drum has a manually engageable knob or like member 31 thereon which projects radially through a circumferential slot 32 in the cylindrical casing 13. When the knob 31 is in the position substantially as illustrated in the drawings, the date sequence 28 is positioned for viewing. In order to locate the date shequence 29 in a position for viewing, the knob is moved rearwardly downwardly along the slot 32 through an arc of approximately 95 degrees.

Figure 5:
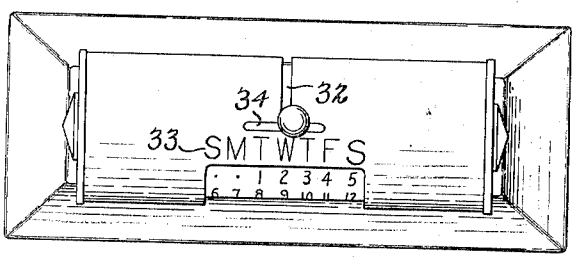
Fig. 5 is a top plan view of the calendar.

The cylindrical casing 13 has, provided thereon adjacent the upper edge of the viewing opening 24, day of the week markings 33. In order to make the instant calendar suitable for perpetual use, it is obviously essential that the date sequences 28 and 29 be movable longitudinally of the cylinder so as to position the first day of the month in vertical alignment with the correct day indicia. For example, in the drawing, the calendar shown is adjusted to locate the first day of the month on a Tuesday. Should the first day of the month fall on Monday, it is necessary to shift the drum longitudinally toward the left hand end of the cylinder as viewed in Figure 5. Similarly, should the first day of the month fall on Sunday, the drum is shifted still farther to the left, and should the first day of the month fall on a Wednesday, the drum 25 is shifted as far as possible to the right. Shifting of the drum is permitted owing to the presence, at the upper or forward end of the circumferential slot 32, of a longitudinal slot 34 which extends on either side of the slot 32. The manually engageable knob 31 is readily shifted along the slot 34 in either direction.

Figures 6, 7:
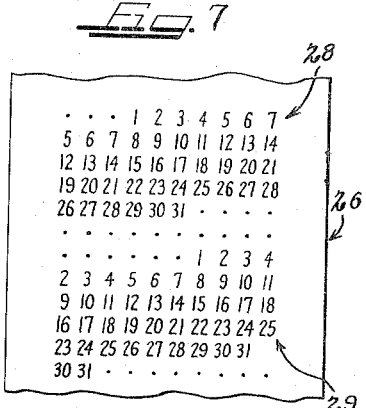
Fig. 6 is a fragmentary rear elevational view of the calendar.
Fig. 7 is a schematic layout of the surface of the calendar drum, illustrating the relationship of the dual date sequences.

Referring to Figure 7, attention is directed to the fact that the day sequences 28 are arranged in ten columns with the numbers in the last three columns repeated in the first three columns. This adapts the date sequence 28 to be shifted longitudinally a distance equivalent to the spacing embracing the first four days of the week without any blank spaces being apparent.

When the first day of the week falls upon Thursday, Friday or Saturday, it is necessary to move the manually engageable knob 31 downwardly rearwardly through slot 32 into position to permit it to be shifted longitudinally of the cylindrical casing along a second longitudinal end slot 35. When the ball 31 is positioned in the slot 35 the date sequence 29 is located in position to be viewed through the window, and this sequence, like the sequence 28, includes ten columns of numbers, the last three columns of which duplicate the numbers of the first three columns. It should be quite apparent that it is a comparatively simple matter to adjust the calendar to any calendar month, and because of the universal adjustability of the drum 25 relative to the cylindrical casing 13, and the protection afforded to it by the bands 27, said calendar can be serviceable year after year without requiring replacement or substitution of any of its parts.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. A calendar, including a tubular housing having a substantially rectangular opening in its wall, day of the week markings on the housing adjacent to one edge of the opening, a drum slidable and rotatable in said housing, two sets of date sequences arranged in columns on the face of said drum either one of which is positionable to be viewed through said opening, said date sequences including repetitions of certain dates adapting the date sequences to be shifted longitudinally of the housing to locate selected columns in proper relation to the day of the week markings.

2. A calendar including a base, a tubular housing mounted on said base, said housing comprising an open ended cylinder, end walls closing the cylinder ends, brackets on the end walls, foot portions on said brackets, a channel co-extensive with the cylinder engaged over the foot portions of said brackets and constituting a mounting for the tubular housing, and means securing the base, channel and brackets together.

3. A calendar of the character recited in claim 2, in which a drum is rotatably mounted within and shiftable longitudinally of the housing, and the housing has a viewing opening therein.

References Cited in the file of this patent

UNITED STATES PATENTS

| | | |
|---|---|---|
| 301,490 | Frost | July 8, 1884 |
| 582,007 | Bradshaw | May 4, 1897 |
| 1,772,112 | Rose | Aug. 5, 1930 |
| 2,553,163 | Berg | May 15, 1951 |
| 2,581,810 | Nichols | Jan. 8, 1952 |